United States Patent Office 3,654,246
Patented Apr. 4, 1972

3,654,246
VULCANIZABLE, AMORPHOUS OLEFINIC TER-
POLYMERS OF ALPHA OLEFINS AND POLY-
ENES PRESENTING AN ALKYLIDENIC GROUP
CONJUGATED WITH A DOUBLE BOND OF A
RING WHICH IS A MEMBER OF AN ENDO-
CYCLIC GROUP
Walter Marconi, Sebastiano Cesca, and Arnaldo Roggero,
S. Donato Milanese, Italy, assignors to Snam Progetti
S.p.A., Milan, Italy
No Drawing. Filed Aug. 6, 1968, Ser. No. 750,478
Claims priority, application Italy, Aug. 8, 1967,
19,319/67
Int. Cl. C08f 17/00
U.S. Cl. 260—80.7       15 Claims ABSTRACT OF THE DISCLOSURE
Novel vulcanizable amorphous terpolymers are disclosed which comprise two alpha-olefins and a polyene containing an alkylidene group conjugated with a double bond of a ring which is a member of an endocyclic system. The process for preparing these terpolymers is also disclosed.

The present invention relates to a new class of vulcanizable, amorphous terpolymers comprised of ethylene, alpha olefins and polyenes presenting an alkylidenic group conjugated with a double bond of a ring which is a member of an endocyclic system.

It is known to prepare terpolymers starting from olefins and di-olefins in such a way to obtain polymers which on the one hand have the advantages of stability characterizing the polyolefins whereas on the other hand, because of the presence of the double bonds, may be vulcanized with the traditional systems used for the natural rubber.

However not all the diolefins may be used as monomers such as ethylene and propylene, as some of them have the tendency to form chains containing "blocks" of the homopolymer type so that the arrangement of the double bonds are not homogeneous throughout the terpolymer; other diolefins have, on the contrary, a very low reactivity and, practically, do not take part to the polymerization reaction and other diolefins tend to inhibit the polymerization reaction.

The diolefins having the tendency to inhibit the polymerization reaction are in general the conjugated diolefins and it is known, indeed, that it is difficult to obtain terpolymers having good properties when a conjugated diolefin as butadiene, isoprene and so on, is used as a third monomer.

We have found now a class of terploymers which provide, after vulcanization, products having very good mechanical features using a third monomer, a particular polyene which has at least two conjugated double bonds; one is present on a side chain and the other one belongs to a ring which is member of an endocyclic system.

It is known in the preparation of the terpolymers that it is necessary that the terpolymer maintains the properties of the alicyclic hydrocarbons.

From this point of view it is surprising that the class of compounds used as termonomer according to the present invention, is able to take part in the polymerization giving rise to terpolymers presenting very good features.

As a matter of fact it is also known that the presence of two conjugated double bonds makes the compounds highly reactive with the active centres of the catalyst and for this reason, up to now, the use of said compounds in the terpolymerization has been disregarded.

The compounds according to the present invention behave as compounds wherein the nonconjugated unsaturation taking part in the polymerization reaction is much more active than the conjugated ones therefore the difficulties concerning the use of conjugated dienes have been overcome.

Moreover they present, with regard to other compounds containing isopropylidenic radicals on side chains but without a system comprising an endomethylenic group, the advantage of the best utilization of the termonomer.

The present invention, on the contrary, allows one to utilize compounds containing conjugated unsaturations and with noticeable advantages as to what is known in the art provided that said compounds comprise, beside said unsaturations, a system with other unsaturation and with an endomethylenic group.

To realize the advantages of the present invention it is therefore critical to have in the compound at the same time:

(a) a side alkylidenic group
(b) a ring having an unsaturation conjugated with (a) and being a member of an endocyclic system where another non-conjugated unsaturation is present.

Examples of said type of polyene are:

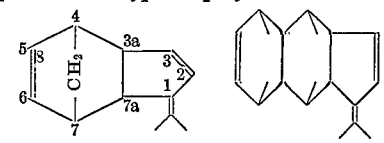

1-isopropyliden-di-cyclo-pentadiene (1-isopropyliden-4,7 endo-methylen-idrin-2,5-diene) and its 2 and/or 3 alkyl-derivatives. 1-isopropyliden-tricyclopentadiene

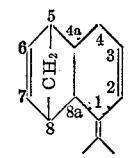

1-isopropyliden-5,8 endomethylen-1,4,4a,5,8,8a-hexahydronaphthalene

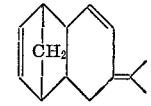

2-isopropyliden-5,8-endomethylen-1,2,4a,5,8,8a-hexahydronaphthalene

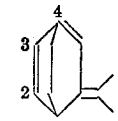

6-isopropyliden-di-cyclo 2.2.2-octa-2,4-diene

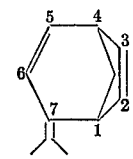

7-isopropyliden-di-cyclo 3.2.1-octa-2,5-diene

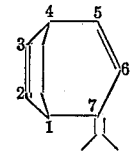

7-isopropyliden-di-cyclo 3.2.2-nona-2,5-diene

Some of these compounds are easily obtainable by Diels and Alder reaction using fulvenes or 3-isopropyliden-cyclo-hexadiene-1,4- or their alkyl-substituted derivatives and cyclic polyenes such as cyclopentadiene and similar dienes.

The two olefins which react the polyene to form the terpolymer are chosen from among the alpha-olefins having from 2 to 6 carbon atoms and in particular they are preferably ethylene and propylene.

For the polymerization step use is made of catalytic systems of the coordinate anionic type constituted by a derivative of a transition metal of the IV and V group of the periodic system and derivatives of the aluminium chosen in the following classes: the first comprises the compounds having the general formula AlRXY where R is an alkyl having from 1 to 12 carbon or hydrogen atom, X and Y equal or different may be hydrogen, alkyl having from 1 to 12 carbon atoms, halogen or derivatives of secondary amines; another class is formed by compounds having a general formula MeAlR$_4$ where Me is an alkaline metal and R is as above mentioned.

These compounds may be also complexed with Lewis bases.

Examples of these compounds are:

$Al(nC_{10}H_{21})_3$  $Al(nC_6H_{13})_3$
$Al(i\text{-}C_4H_9)_3$  $AlCl_2(C_2H_5)$
$Al(C_2H_5)_2Cl$  $Al(i\text{-}C_4H_9)_2Cl$
$Al(i\text{-}C_4H_9)Cl_2$  $AlHCl_2 \cdot O(C_2H_5)_2$
$AlH_2N(CH_3)_2$  $AlHClN(CH_3)_2$
$AlH_3 \cdot N(CH_3)_3$  $LiAl(n\text{-}C_8H_{17})_4$ Examples of compounds of the transition metal are: VCl$_4$, VOCl$_3$, vanadium triacetylacetonate, VClO(OC$_2$H$_5$)$_2$, VCl$_3$·3THF(THF=tetrahydrofuran)TiCl$_4$ and analogs.

Another suitable catalytic system according to the present invention is the one constituted by compounds of transition metals in combination with linear polymeric compounds of aluminum of a polyiminic type containing in the molecule repeated units of the following type:

where R represents an aryl or alkyl or cycloalkyl hydrocarbon radical. Said compounds may be easily prepared by reaction of LiAlH$_4$ with the chlorohydrates of the amines or by reaction of AlH$_3$ with primary amines.

The preparation of said compounds is reported by E. Wiberg, A. May in Zeitschrift fur Naturforschung 106, 232 (1955) and by R. Ehrlich and co-workers Inorg. Chem. 3, 628 (1964).

The obtained terpolymers, once vulcanized ("gum stock") present very good mechanical features as for example:

Modulus at 100% elongation comprised between 5 and 40 kg./cm.$^2$
Tensile stregnth comprised between 20 and 70 kg./cm.$^2$
Elongation at breaking between 200 and 650%
Permanent deformation after breaking not higher than 15%.

The observed good features show a homogeneous distribution of the double bonds in the chain.

On the other hand the analysis of the content of double bonds in the polymer, effected in the infrared, shows a percentage of polyenes comprised between 1 and 15%.

It is also possible to obtain higher percentages of unsaturation but this obviously makes the terpolymer less desirable economically.

The polymerization temperature is between −30° and +40° C. and the operation is carried out at pressures between 1 and 50 atmospheres.

The reaction may be carried out, but this is not strictly necessary, in solvents which in general are chosen among aromatic, aliphatic, cycloaliphatic hydrocarbons and also saturated and unsaturated chlorinated hydrocarbons.

The modes of recovery of the polymer, and the recipes of vulcanization are the ones generally used in the art.

The following examples are given by way of illustration but do not limit at all the present invention:

EXAMPLE 1

400 cc. of anhydrous n-heptane are introduced, in a stream of nitrogen, into a 800 cc. glass reactor; the apparatus, equipped with an efficient stirrer, charging cone and thermometric sheath, is placed in a thermostatic bath at −20° C. and kept at this temperature during the whole polymerization time.

Thereafter a gaseous mixture of ethylene and propylene is blown into n-heptane, the molar ratio propylene/ethylene being 2.5 and the flow 200 Nl/h., for a period of about 30 minutes. In order to make easier the reaching of the equilibrium of saturation, the solvent is vigorously stirred and the gas mixture is directed to the bottom of the reactor which is suitably dimensioned in order to realize a quick distribution of the gases in the n-heptane.

Thereafter 1.5 mmoles/l. of (C$_2$H$_5$)$_2$AlCl and 0.75 mole/l. of anisole are introduced into the reactor, whereas the solvent is kept under vigorous stirring; subsequently 1.25 cc./l. of 1-isopropyliden-dicyclopentadiene having a chromatographic purity of 98% are introduced.

The reaction of terpolymerization is started by a further introduction into the reactor of 0.25 mmole/l. of VCl$_4$; at the same time a gaseous stream of ethylene and propylene having the initial composition and flow is continuously blown into the catalytic solution.

The polymerization is carried out for 10 minutes; it is stopped by the addition to the reaction solution, of additional n-butanol.

The final solution is coagulated by pouring it, under vigorous stirring, into a solution of ethanol-acetone (1:1), after acid washing with an aqueous solution of HCl.

From the coagulum bath, a white coloured elastomer having the appearance of the non-vulcanized rubber is obtained.

It is purified by dissolution in a mixture CCl$_4$CHCl$_3$ (60:40) containing 0.5 gr. of N-phenyl-N'-isopropylphenylendiamine, and by subsequent precipitation from ethanol.

After drying in a stove at 50° C. under vacuum the obtained product weighs 11.4 gr.

Upon X-ray examination, there is indicated an entirely amorphous material whereas the determination of the intrinsic viscosity effected in toluene at 30° C., gives a value of $[\eta]$=2.73 dl./gr.

The appraisal of the ethylene percentage indicates that the produced elastomer contains about 47% by weight ethylene. The NMR spectrum (nuclear magnetic resonance) of the polymer shows a signal at about 1.7 p.p.m. which may be ascribed to the protons of the isopropenylidenic group whereas the spectrum reveals an absorption at 254 mµ in agreement with the presence of two conjugated double bonds.

The titration of the unsaturations by means of BrI reveals a percentage in the polymer of 2.8% by weight of 1-isopropylidendicyclopentadiene.

A part of the produced elastomer has been subjected to vulcanization according to the following recipe:

Terpolymer—100 parts
Stearic acid—0.5 part
ZnO—5 parts
Sulphur—2 parts
2-mercaptobenzothiazole—1 part
Tetramethyl-thiurame disulphide—2 parts
Vulcanization temperature—175° C.
Vulcanization time—20 minutes The determination of some properties on the vulcanized product has given the following results:

Modulus at 100% elongation (kg./cm.$^2$) -------- 8.7
Tensile strength (kg./cm.$^2$) ------------------ 37
Elongation at breaking (percent) ---------------- 615
Permanent deformation after breaking (percent) -- 13

EXAMPLE 2

The preceding example is repeated with only one difference i.e. a double amount of catalyst and of 1-isopropylidendicyclopentadiene is used. In 10 minutes of polymerization 15.5 grams of elastomer are obtained, said elastomer shows [$\eta$]=2.30 dl./gr., a 50% by weight content of ethylene and a 5.5% by weight content of 1-isopropliden-dicyclopentadiene.

After vulcanization, using the recipe of Example 1, the following results are obtained:

Modulus at 100% elongation (kg./cm.$^2$) -------- 24.2
Tensile strength (kg./cm.$^2$) ------------------ 68
Elongation at breaking (percent) ---------------- 225
Permanent deformation after breaking (percent) -- 6

The example is repeated by making use of 2.5 cm.$^3$/l. of isopropylidentetrahydroindene. In 10 minutes of polymerization 9.5 gr. of polymer are obtained, this polymer showing [$\eta$]=1.63 dl./gr., a 50% by weight ethylene content, a 1.9% by weight isopropylidentetrahydroindene content.

After vulcanization according to the recipe 1, the following results are obtained:

Modulus at 100% elongation (kg./cm.$^2$) --------- 6
Tensile strength (kg./cm.$^2$) ------------------ 19
Elongation at breaking (percent) ---------------- 537
Permanent deformation after breaking (percent) -- 17

EXAMPLE 3

Use is made of the apparatus and process described in Example 1 by introducing into the reactor:

400 cc. anhydrous n-heptane
A mixture of propylene and ethylene having a molar ratio: $C_3/C_2$=2.5 and a flow 100 Nl/h.
4.3 moles/l. of $(C_2H_5)_2AlCl$
2.5 cm.$^3$/l. of 1-isopropyliden-dicyclopentadiene
0.718 mole/l. of $V(C_5H_7O_2)_3$ dissolved in 10 cc. of toluene.

13.0 gr. of elastomer having [$\eta$]=1.44 dl./gr., 47% of ethylene and 5.5% of 1-isopropyliden-dicyclopentadiene are so obtained.

After vulcanization the following results are obtained:

Modulus at 300% elongation (kg./cm.$^2$) --------- 5.7
Tensile strength (kg./cm.$^2$) ------------------ 22
Elongation at breaking (percent) ---------------- 480
Permanent deformation after breaking (percent) -- 15

EXAMPLE 4

Example 3 is repeated by making use of amounts of catalyst and of 1-isopropyliden-dicyclopentadiene which are 1½ and 2 times the ones used in Example 3.

14.6 gr. of elastomer showing [$\eta$]=1.22 dl./gr., ethylene=47% by weight and 1-isopropyliden-dicyclopentadiene 7.5% by weight are obtained after 10 minutes of polymerization.

After vulcanization the following measure units are carried out:

Modulus at 100% elongation (kg./cm.$^2$) --------- 6.9
Tensile strength (kg./cm.$^2$) ------------------ 43
Elongation at breaking (percent) ---------------- 360
Permanent deformation after breaking (percent) -- 8

EXAMPLE 5

The procedure of Example 1 is repeated by introducing into the reactor, consecutively, 400 cc. of n-heptane, a mixture of ethylene-propylene having a molar ratio $C_3/C_2$=2; 2.5 moles/l. of $(C_2H_5)_{1.5}AlCl_{1.5}$, 1.25 cc./l. of 1-isopropylidenedicyclopentadiene and 0.5 mole/l. of $VOCl_3$.

5.8 gr. of elastomer showing [$\eta$]=1.35 dl./gr. ethylene=58% by weight 4.1% by weight of 1-isopropylidendicyclopentadiene are obtained in 10 minutes of polymerization, carried out at the temperature of 30° C.

After vulcanization, the following results are obtained:

Modulus at 100% (kg./cm.$^2$) ------------------- 37
Tensile strength (kg./cm.$^2$) ------------------ 68
Elongation at breaking (percent) ---------------- 212
Permanent deformation after breaking (percent)--- 4

EXAMPLE 6

Using the typical procedure as outlined above, we have introduced into the reactor:

400 cc. of n-heptane, a mixture ethylene-propylene having a molar ratio $C_3/C_2$=2.0; 12.5 mmoles/l. of $(C_2H_5)_2AlCl$, 25 cc./l. of 1-isopropyliden-dicyclopentadiene and 1.25 mmoles/l. of $VO(O-nC_4H_9)_3$.

The polymerization is carried out at 0° C. and in 10 minutes gives: 9.9 gr. of elastomer having [$\eta$]=2.01 dl./gr.; 64% by weight of ethylene and 4% by weight of 1-isopropyliden-dicyclopentadiene.

After vulcanization the following results are obtained:

Modulus at 100% (kg./cm.$^2$) ------------------- 22
Tensile strength (kg./cm.$^2$) ------------------ 64
Elongation at breaking (percent) ---------------- 215
Permanent deformation (percent) ----------------- 4

EXAMPLE 7

To the apparatus described in Example 1 containing two dripping funnels, 20 mmoles of $(C_2H_5)_2AlCl$ and 2 mmoles of $VOCl(OC_2H_5)_2$ dissolved in 20 cc. of n-heptane are introduced to 380 cc. of n-heptane previously introduced into the reactor, this n-heptane being saturated at the temperature of −10° C. with a mixture of ethylene-propylene having a molar ratio $C_3/C_2$=4.0. Finally 3.75 cc./l. of 1-isopropyliden-dicyclopentadiene are introduced.

The two solutions containing the Al and the V compounds are added over a period of 15 minutes; at the end, the polymeric solution is coagulated, resulting in 14.5 gr. of elastomer which, upon analysis, reveals [$\eta$]=0.58 dl./gr., ethylene 40% by weight and 1-isopropyliden-dicyclopentadiene 4.1% by weight.

EXAMPLE 8

The apparatus and process described in Example 1 is repeated by introducing consecutively: 400 cc. of n-heptane, 11.8 mmoles/l. of $(C_2H_5)_2AlCl$, 5 cc./l. of 1-isopropyliden-dicyclopentadiene and 1.97 mmoles/l. of $VCl_3 \cdot 3C_4H_8O$.

The catalytic solution, kept at −20° C. was previously saturated with a mixture of ethylene-propylene having a molar ratio $C_3/C_2$=2.0. 10.6 gr. of elastomer may be collected after 5 minutes of polymerization; this elastomer at the analysis shows a content of 6.2% by weight of 1-isopropyliden-dicyclopentadiene, 49% by weight of ethylene and an intrinsic viscosity [$\eta$]=0.89 dl./gr.

After vulcanization the following values are obtained:

Modulus 300% (kg./cm.$^2$) ---------------------- 26
Tensile strength (kg./cm.$^2$) ------------------ 65
Elongation at breaking (percent) ---------------- 485
Permanent deformation (percent) ----------------- 6

EXAMPLE 9

400 cc. of n-heptane, 15 mmoles/l. of $Al(n-C_6H_{13})_4$; 5 cc./l. of 1 - isopropyliden-dicyclopentadiene; 12.5 mmoles/l. of $TiCl_4$, together with a gaseous mixture of ethylene-propylene having a molar ratio $C_3/C_2$=2.0 are introduced into the reactor as described in Example 1. The whole reactor is kept at −20° C.

The polymeric solution coagulates after 10 minutes of reaction, resulting in 49 gr. of elastomer product, which analyzes as 30% by weight of 1-isopropyliden-dicyclopentadiene, 70% by weight ethylene and having an intrinsic viscosity [η]=2.15 dl./gr.

EXAMPLE 10

400 cc. of n-heptane, 37.5 mmoles/l. of $HCl_2Al \cdot O(C_2H_5)_2$ 7.5 cc./l. of 1-isopropyliden-dicyclopentadiene and 12.5 mmoles/l of $VCl_4$ are introduced into the reactor as described in Example 1.

The reaction solution kept at 20° C., was previously saturated with a mixture of ethylene-propylene having a molar ratio $C_3/C_2=2.0$.

3.0 gr. of elastomer are obtained after 10 minutes of polymerization; this elastomer analyzes as 2.3% by weight of 1-isopropyliden-dicyclopentadiene has an intrinsic viscosity [η]=1.84 dl./gr. contains a 49% by weight ethylene content.

EXAMPLE 11

Example 10 is repeated with the only difference that the catalytic system is replaced by 9.75 mmoles/l. of $HClAlN(CH_3)_2$ and 7.5 mmoles/l. of $VCl_4$.

8.32 gr. of elastomer are obtained in 10 minutes of polymerization, this elastomer showing 3.5% of 1-isopropyliden-dicyclopentadiene [η]=3.20 dl./gr. and a 53% by weight content of ethylene.

EXAMPLE 12

Example 11 is repeated with the only difference that the catalytic system is replaced by 11.25 mmoles/l. of N-isopropyl-polyimino-alane and 7.5 mmoles/l. of $VCl_4 \cdot 4.7$ gr.

of elastomer are obtained in 10 minutes of polymerization, this elastomer showing at analysis of 3.2% content of 1-isopropyliden-dicyclopentadiene, [η]=3.52 dl./gr. and a 49% by weight content of ethylene.

After vulcanization according to the recipe shown in Example 1, the following results are obtained:

Modulus 300% (kg./cm.²) _____ 11
Tensile strength (kg./cm.²) _____ 23
Elongation at breaking (percent) _____ 560

What we claim is:

1. Vulcanizable amorphous linear terpolymers comprising two mono-olefinic monomers and a polyene selected from the group consisting of 1-alkylidene-dicyclopentadienes, 1 - alkylidene - tricyclopentadienes, alkylidene-endomethyl - hexahydronaphthalenes, alkylidene-endomethyl-hexahydro-naphthalenes, alkylidene-bicyclooctadienes, alkylidene-bicyclononadienes and alkyl derivatives thereof.

2. Vulcanizable amorphous linear terpolymers as in claim 1 wherein the olefinic monomers are ethylene and propylene.

3. Vulcanizable amorphous linear terpolymers, as in claim 1, where the amount of polyenes in the polymer is between 1 and 15% by weight.

4. Elastomers obtained by vulcanization of the terpolymers claimed in claim 1.

5. Process for the preparation of the terpolymers as claimed in claim 1 characterized in that the terpolymerization takes place in presence of catalytic systems comprising a compound of a transition metal in combination with linear polymeric compounds of the aluminum of polyiminic nature containing in the molecule repeated unities of the type:

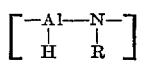

wherein R represents an alkyl, aryl or cycloalkyl hydrocarbon radical.

6. Process for the preparation of terpolymers as claimed in claim 1 characterized in that the terpolymerization takes place in presence of catalytic systems constituted by a derivative of a transition metal of IV or V group of the periodic system and by an aluminum compound having a general formula AlRXY where R is an alkyl from 1 to 12 carbon or hydrogen atoms, X and Y equal or different may be hydrogen, alkyl from 1 to 12 carbon atoms, halogen or derivatives of secondary amines.

7. Process as in claim 6 characterized in that the aluminum compound having formula AlRXY is complexed with Lewis bases.

8. Process as in claim 7, characterized in that the catalytic system is constituted by a derivative of a transition metal of the IV and V group of the periodic system and by an aluminum compound having formula $MeAlR_4$ where Me is an alkaline metal and R is an alkyl from 1 to 12 carbon or hydrogen atoms.

9. Process as in claim 1 where the aluminum compound is selected from the group consisting of:

| | |
|---|---|
| $Al(nC_{10}H_{21})_3$ | $Al(nC_6H_{13})_3$ |
| $Al(i-C_4H_9)_3$ | $AlCl_2(C_2H_5)$ |
| $Al(C_2H_5)_2Cl$ | $Al(i-C_4H_9)_2Cl$ |
| $Al(i-C_4H_9)Cl_2$ | $AlHCl_2 \cdot O(C_2H_5)_2$ |
| $AlH_2N(CH_3)_2$ | $AlHClN(CH_3)_2$ |
| $AlH_3 \cdot N(CH_3)_3$ | $LiAl(n-C_8H_{17})_4$ |

10. Process as in claim 5 characterized in that the operation is carried out at temperatures between −30° C. and +40° C.

11. Process as in claim 5 characterized in that the operation is carried out by making use of pressures between 1 and 50 atmospheres.

12. Process as in claim 6 characterized in that the operation is carried out at temperatures between −30° and +40° C.

13. Process as in claim 7 characterized in that the operation is carried out at temperatures between −30° C. and +40° C.

14. Process as in claim 6 characterized in that the operation is carried out by making use of pressures between 1 and 50 atmospheres.

15. Process as in claim 7 characterized in that the operation is carried out by making use of pressures between 1 and 50 atmospheres.

References Cited

UNITED STATES PATENTS

| 2,537,638 | 1/1951 | Kitchen | 260—666 |
| 3,505,420 | 4/1970 | Amiard | 260—666 |
| 3,464,959 | 9/1969 | Marconi et al. | 260—79.5 |
| 3,470,138 | 9/1969 | Marconi et al. | 260—80.78 |

FOREIGN PATENTS 6512519  3/1966  Netherlands.

JOSEPH L. SCHOFER, Primary Examiner

R. S. BENJAMIN, Assistant Examiner

U.S. Cl. X.R.

260—80.78, 79.5 P, 666 A

UNITED STATES PATENT OFFICE
CERTIFICATE OF CORRECTION

Patent No. 3,654,246    Dated April 4, 1972

Inventor(s) Walter Marconi et al

It is certified that error appears in the above-identified patent and that said Letters Patent are hereby corrected as shown below:

Column 1, line 39, "such as" should read -- with --; line 54, after "using" insert -- as --.

Signed and sealed this 20th day of March 1973.

(SEAL)
Attest:

EDWARD M. FLETCHER, JR.
Attesting Officer

ROBERT GOTTSCHALK
Commissioner of Patents